W. L. MISNER.
WHIFFLETREE GUARD.
APPLICATION FILED SEPT. 11, 1911.
1,033,920.
Patented July 30, 1912.
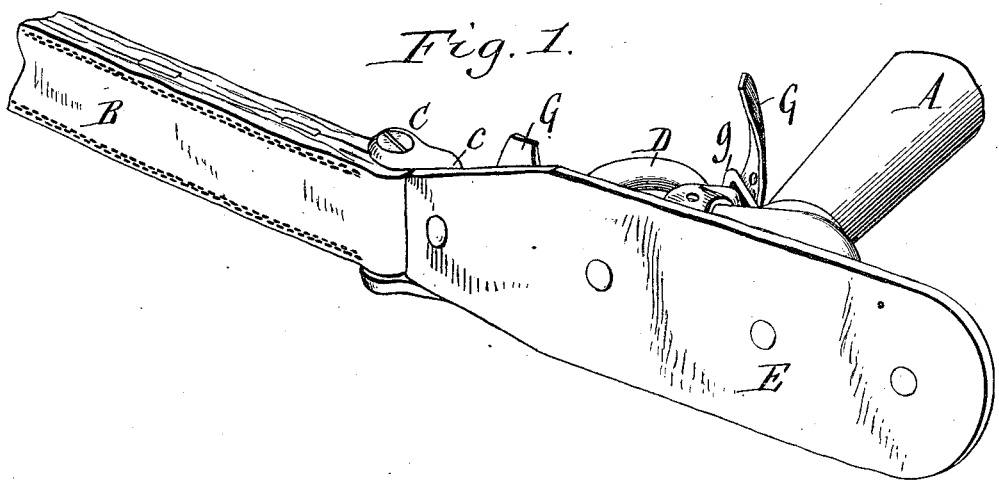
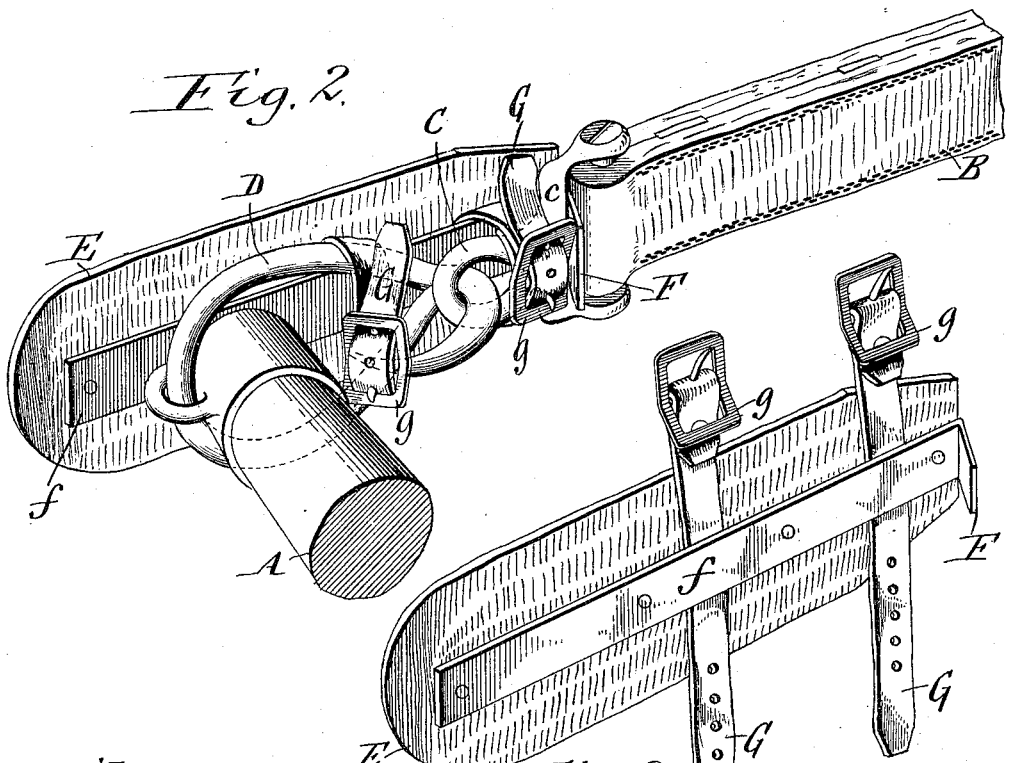

UNITED STATES PATENT OFFICE.

WILLIAM L. MISNER, OF TONAWANDA, NEW YORK.

WHIFFLETREE-GUARD.

1,033,920. Specification of Letters Patent. Patented July 30, 1912.

Application filed September 11, 1911. Serial No. 648,757.

*To all whom it may concern:*

Be it known that I, WILLIAM L. MISNER, a citizen of the United States, residing at Tonawanda, in the county of Erie and State of New York, have invented new and useful Improvements in Whiffletree-Guards, of which the following is a specification.

In plowing or cultivating the soil in orchards and vineyards, the whiffletrees attached to the plow or other agricultural implement are liable to bark and damage the trees and vines.

One of the objects of my invention is the provision of an efficient and inexpensive guard for the end of the whiffletree which will keep the same out of contact with trees and vines, so as to protect them from injury.

A further object is to so construct the guard that it forms a practically smooth continuation of the face of the trace and so that its front end fits closely against the rear end of the trace, to avoid the formation of a gap in which fence barbs or other objects might catch.

In the accompanying drawings: Figure 1 is a perspective view of the outer side of the guard applied to a whiffletree and a trace. Fig. 2 is a perspective view of the inner side of the guard applied to said parts. Fig. 3 is a detached perspective view of the guard.

Similar letters of reference indicate corresponding parts throughout the several views.

A indicates the end portion of a whiffletree, B the trace having the usual cockeye C or similar attachment at its rear end, and D indicates the customary hook which connects the cockeye with the end of the whiffletree.

E indicates the improved guard which consists of an elongated plate or cap extending rearwardly from the trace and covering the outer end of the whiffletree and the connections C and D. This guard is preferably constructed of leather or other suitable pliable material so as to yield to a certain extent upon rubbing against a tree or vine and prevent injury to the same. At its front end the guard is provided with an attachment, preferably consisting of an inwardly-turned hook or lip F which engages with the cross bar $c$ of the cockeye, so as to hold the guard against longitudinal displacement. This hook fits snugly between said cross bar and the rear end of the trace to form a close joint between the trace and the guard and avoid the formation of a space or gap in which fence barbs or other projections might catch. As shown, the front end of the guard plate E preferably terminates at the hook F, so as to form a butt-joint with the rear end of the trace. By this construction, the face of the guard is rendered substantially flush with the face of the trace and the guard forms a practically smooth continuation of the trace free from shoulders or projections liable to bark or otherwise injure trees or vines with which the guard may come in contact.

The hook F is preferably formed integral with a comparatively long shank or metallic strip $f$ riveted or otherwise secured to the inner side of the guard and extending practically throughout its length, so as to serve as a reinforcement therefor. The guard may be held in place against the end of the whiffletree by a fastening or fastenings of any suitable construction. The preferred devices shown in the drawings consist of a pair of straps G having buckles $g$ and confined between the shank $f$ and the inner side of the guard, these straps being adapted to embrace the cockeye C and the hook D respectively, as illustrated in Fig. 2. These straps in conjunction with the hook F hold the guard both against longitudinal and outward displacement on the whiffletree.

While effectually guarding against injury to trees and vines, this improved device is readily applicable to any ordinary harness having a cockeye C or equivalent attachment and requires no special construction of the harness to receive it. Its simplicity moreover enables it to be produced at small cost.

I claim as my invention:

1. A whiffletree-guard consisting of a plate and a metallic reinforcing strap secured to said plate and extending lengthwise thereof, said strap being provided at its front end with a hook adapted to engage the rear attachment of a trace.

2. A whiffletree-guard consisting of a plate, a metallic reinforcing strap secured to the inner side of said plate and extending lengthwise thereof, said strap being provided at its front end with a hook, and a fastening strap having a buckle and confined between said plate and said reinforcing strap.

3. The combination with a whiffletree, a trace provided with a cockeye and a connection between said cockeye and the whiffletree, of a guard arranged over the end of the whiffletree and provided with an inwardly-turned hook engaging the cross bar of said cockeye, the front end of the guard terminating at said hook, whereby the guard forms a closed, butt-joint with the trace.

Witness my hand this 8th day of September, 1911.

WILLIAM L. MISNER.

Witnesses:
CLARA A. MISNER,
C. F. GEYER.

Copies of this patent may be obtained for five cents each, by addressing the "Commissioner of Patents, Washington, D. C."